(12) United States Patent
Bickham et al.

(10) Patent No.: US 8,693,834 B2
(45) Date of Patent: Apr. 8, 2014

(54) FEW MODE OPTICAL FIBERS FOR MODE DIVISION MULTIPLEXING

(75) Inventors: Scott Robertson Bickham, Corning, NY (US); Ming-Jun Li, Horseheads, NY (US); Daniel Aloysius Nolan, Corning, NY (US); Ji Wang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 209 days.

(21) Appl. No.: 13/420,037

(22) Filed: Mar. 14, 2012

(65) Prior Publication Data

US 2013/0071114 A1 Mar. 21, 2013

Related U.S. Application Data

(60) Provisional application No. 61/523,552, filed on Aug. 15, 2011.

(51) Int. Cl.
*H04B 10/00* (2013.01)

(52) U.S. Cl.
USPC ............ 385/127; 398/142; 398/140; 398/143

(58) Field of Classification Search
USPC ............................ 398/140–143; 385/123–128
See application file for complete search history.

(56) References Cited

U.S. PATENT DOCUMENTS

| | | | |
|---|---|---|---|
| 4,915,468 A * | 4/1990 | Kim et al. | 385/28 |
| 5,343,036 A * | 8/1994 | Bohnert | 250/227.19 |
| 5,818,630 A * | 10/1998 | Fermann et al. | 359/341.31 |
| 6,429,963 B1 * | 8/2002 | Berkey et al. | 359/337.2 |
| 6,614,961 B2 * | 9/2003 | Kim et al. | 385/43 |
| 6,711,332 B2 * | 3/2004 | Hebgen et al. | 385/124 |
| 6,766,089 B2 * | 7/2004 | Arai et al. | 385/123 |
| 6,798,962 B2 * | 9/2004 | Berkey et al. | 385/124 |
| 6,810,185 B2 * | 10/2004 | Qi et al. | 385/127 |
| 6,901,196 B2 | 5/2005 | Takahashi et al. | |
| 6,941,054 B2 * | 9/2005 | Tirloni et al. | 385/127 |
| 7,187,833 B2 | 3/2007 | Mishra | |
| 7,272,286 B2 * | 9/2007 | Provost et al. | 385/123 |
| 7,406,237 B2 * | 7/2008 | Bickham et al. | 385/127 |
| 7,492,999 B2 * | 2/2009 | Imamura | 385/124 |
| 7,574,088 B2 | 8/2009 | Sugizaki et al. | |

(Continued)

OTHER PUBLICATIONS

International Search Report issued Oct. 9, 2012 in counterpart application No. PCT/12/049289.

(Continued)

*Primary Examiner* — Agustin Bello
(74) *Attorney, Agent, or Firm* — Svetlana Short

(57) ABSTRACT

A few mode optical fiber suitable for use in a mode division multiplexing (MDM) optical transmission system is disclosed. The optical fiber has a graded-index core with a radius $R_1$ in the range from 8 μm to 14 μm, an alpha value greater than or equal to about 2.3 and less than about 2.7 at a wavelength of 1550 nm, and a maximum relative refractive index $\Delta_{1MAX}$ from about 0.3% to about 0.6% relative to the cladding. The optical fiber also has an effective area greater than about 90 μm² and less than about 160 μm². The core and cladding support only the LP01 and LP11 modes at wavelengths greater than 1500 nm. The cladding has a maximum relative refractive index $\Delta_{4MAX}$ such that $\Delta_{1MAX} > \Delta_{4MAX}$, and the differential group delay between the LP01 and LP11 modes is less than about 0.5 ns/km at a wavelength of 1550 nm.

20 Claims, 8 Drawing Sheets

(56) References Cited

U.S. PATENT DOCUMENTS

| | | | |
|---|---|---|---|
| 7,853,110 B2 | 12/2010 | Bickham et al. | |
| 7,865,050 B1* | 1/2011 | Sun | 385/123 |
| 7,947,945 B2* | 5/2011 | Bookbinder et al. | 250/227.14 |
| 8,081,854 B2* | 12/2011 | Yoon et al. | 385/124 |
| 8,290,316 B2* | 10/2012 | Molin et al. | 385/12 |
| 2010/0028020 A1* | 2/2010 | Gholami et al. | 398/159 |
| 2010/0290781 A1* | 11/2010 | Overton et al. | 398/43 |
| 2013/0071114 A1* | 3/2013 | Bickham et al. | 398/44 |

OTHER PUBLICATIONS

Donlagic, D., "Opportunities to Enhance Multimode Fiber Links by Application of Overfilled Launch", Journal of Lightwave Technology, vol. 23, No. 11, pp. 3526-3539, Nov. 2005.

Jeunhomme, Single Mode Fiber Optics, pp. 39-44, Marcel Dekker, New York 1990.

Kubota, H. et al, "Intermodal group velocity dispersion of few-mode fiber", IEICE Electronics Express, vol. 7. No. 20, 1552-1556, Oct. 25, 2010.

Lenahan, T.A., "Calculation of Modes in an Optical Fiber Using a Finite Element Method and EISPACK", Bell Syst. Tech. J., vol. 62, No. 9, part 1, pp. 2663-2694, Nov. 1983.

Li, A., et al, "Reception of Mode and Polarization Multiplexed 107-Gb/s Co-OFDM Signal over a Two-Mode Fiber", Paper No. PDPB8, pp. 1-3, proceedings of OFC/NFOEC, Mar. 6-10, 2011.

Ryf, R. et al, "Space-division multiplexing over 10km of three-mode fiber using coherent 6×6 MIMO processing", Paper No. PDPB10, pp. 1-3, proceedings of OFC/NFOEC, Mar. 6-10, 2011.

Salsi, M. et al, "Transmission at 2×100Gb/s, over Two Modes of 40km-long Prototype Few-Mode Fiber, using LCOS-based Mode Multiplexer and Demultiplexer", Paper No. PDPB9, pp. 1-3, proceedings of OFC/NFOEC, Mar. 6-10, 2011.

\* cited by examiner

US 8,693,834 B2

FEW MODE OPTICAL FIBERS FOR MODE DIVISION MULTIPLEXING

CROSS-REFERENCE TO RELATED APPLICATION

This application claims the benefit of priority under 35 U.S.C. §119 of U.S. Provisional Application Ser. No. 61/523,552 filed on Aug. 15, 2011 the content of which is relied upon and incorporated herein by reference in its entirety.

FIELD

The present specification generally relates to optical fibers and more specifically to few mode optical fibers used for mode division multiplexing (MDM).

BACKGROUND

The explosive growth in the volume and variety of multimedia telecommunication applications continues to drive speed demands for internet traffic and motivate research in backbone fiber-optic communication links. Coherent communications and electronic digital signal processing (DSP)-based receivers have been accepted in recent years as the next-generation standards for long-haul systems due to their flexibility, scalability and ability to compensate for various transmission impairments, including fiber nonlinearity. As fiber nonlinearity places a limit on achievable spectral efficiency, large effective-area ($A_{eff}$) single-mode fibers (SMFs) have been designed for reducing nonlinearity penalties.

However, the spectral efficiency of an optical fiber increases slowly with increasing effective area, so another solution is needed to increase system capacity. Recent experiments have demonstrated that it is possible to transmit signals in more than one spatial propagation mode of a few mode fiber (FMF) using multiple-input multiple-output (MIMO) techniques. Few mode fibers are particularly attractive for this application because the computational complexity directly scales with number of modes, and utilizing only a few modes reduces the risk of modal mixing that can lead to bit error rate penalties from multipath interference (MPI).

Few mode optical fibers previously proposed for optical fiber communications systems have either step index or parabolic cores in which the core diameter is increased relative to single mode fiber to support at least the LP11 mode in addition to the fundamental LP01 mode. With both of these core designs, there are large delay differences between the fundamental LP01 mode and the LP11 mode at one or more wavelengths in the 1550 nm window. These large delay differences make it difficult to demultiplex the optical signals in the time domain using MIMO.

Accordingly, a need exists for alternative designs for few mode optical fibers with low loss and small differential group delays (DGD).

SUMMARY

An aspect of the disclosure is a few mode optical fiber that includes a glass core and a glass cladding that immediately surrounds the core. The glass core has a radius $R_1$ in the range from about 8 µm to about 14 µm, a graded refractive index profile with an alpha value greater than or equal to about 2.3 and less than about 2.7 at a wavelength of 1550 nm, a maximum relative refractive index $\Delta_{1MAX}$ in the range from about 0.3% to about 0.6% relative to a glass cladding, and an effective area at 1550 nm greater than about 90 µm² and less than about 160 µm². The glass cladding has a maximum relative refractive index $\Delta_{4MAX}$ such that $\Delta_{1MAX} > \Delta_{4MAX}$. The optical fiber supports the propagation and transmission of only the LP01 and LP11 modes at wavelengths greater than 1500 nm, with a group delay between the two modes that is less than about 0.5 ns/km at a wavelength of 1550 nm.

Another aspect of the disclosure is a few mode optical fiber that includes a glass core and glass cladding surrounding the glass core. The glass core has a radius $R_1$ from about 8 µm to about 14 µm, a graded refractive index profile with an alpha value greater than or equal to about 1.9 and less than about 2.7 at a wavelength of 1550 nm, a maximum relative refractive index $\Delta_{1MAX}$ from about 0.3% to about 0.6% relative to a glass cladding, and an effective area at 1550 nm greater than about 90 µm² and less than about 160 µm². The glass cladding has a low-index ring surrounding the core. The low-index ring has a minimum relative refractive index $\Delta_{2MIN} < 0$. The glass cladding also has an outer cladding layer surrounding the low-index ring and having a maximum relative refractive index $\Delta_{4MAX}$ such that $\Delta_{1MAX} > \Delta_{4MAX} > \Delta_{2MIN}$. The glass core and glass cladding support the propagation and transmission of only the LP01 and LP11 modes at wavelengths greater than 1500 nm.

Another aspect of the disclosure is a few mode optical fiber that includes a glass core surrounded by a glass cladding. The class core has a radius $R_1$ in the range from about 8 µm to about 14 µm, a graded refractive index profile with an alpha value greater than or equal to about 1.9 and less than about 2.7 at a wavelength of 1550 nm, a maximum relative refractive index $\Delta_{1MAX}$ from about 0.3% to about 0.6% relative to a glass cladding, and an effective area at 1550 nm greater than about 90 µm² and less than about 160 µm². The glass cladding has a low-index ring that surrounds the glass core but is spaced apart therefrom by an inner cladding with relative refractive index $\Delta_3$. The low-index ring has a minimum relative refractive index $\Delta_{MIN} < 0$. The glass cladding also has an outer cladding layer that surrounds the low-index ring and has a maximum relative refractive index $\Delta_{4MAX}$ such that $\Delta_{1MAX} > \Delta_{4MAX} > \Delta_{2MIN}$ and $\Delta_3 > \Delta_{2MIN}$. The glass core and glass cladding support the propagation and transmission of only the LP01 and LP11 modes at wavelengths greater than 1500 nm.

Additional features and advantages of the disclosure are set forth in the detailed description that follows, and in part will be readily apparent to those skilled in the art from that description or recognized by practicing the embodiments described herein, including the detailed description that follows, the claims, as well as the appended drawings. The claims are incorporated into and constitute part of the Detailed Description as set forth below.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
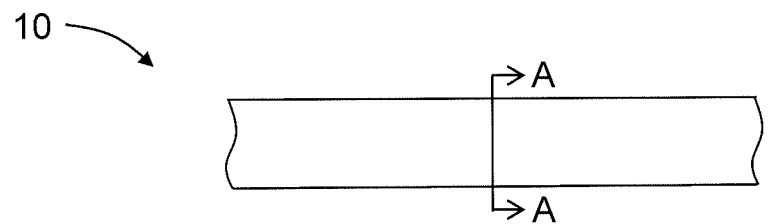
FIG. 1 a side view of a section of a few mode optical fiber according embodiments described herein.

Reference will now be made in detail to embodiments of optical fibers for use as long haul transmission fibers, examples of which are illustrated in the accompanying drawings. Whenever possible, the same reference numerals are used throughout the drawings to refer to the same or like parts.

TERMINOLOGY

The following terminology will be used herein to described the optical fibers, with some of the parameters being introduced and defined below in connection with the various example embodiments:

The term "refractive index profile," as used herein, is the relationship between the refractive index or the relative refractive index and the radius of the fiber.

The term "relative refractive index," as used herein, is defined as:

$$\Delta(r)\% = 100 \times [n(r)^2 - n_{REF}^2)]/2n(r)^2,$$

where n(r) is the refractive index at radius r, unless otherwise specified. The relative refractive index is defined at 1550 nm unless otherwise specified. In one aspect, the reference index $n_{REF}$ is silica glass. In another aspect, $n_{REF}$ is the maximum refractive index of the cladding. As used herein, the relative refractive index is represented by Δ and its values are given in units of "%", unless otherwise specified. In cases where the refractive index of a region is less than the reference index $n_{REF}$, the relative refractive index is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative refractive index is positive and the region can be said to be raised or to have a positive index.

The term "updopant," as used herein, refers to a dopant which raises the refractive index of glass relative to pure, undoped $SiO_2$. The term "downdopant," as used herein, is a dopant which has a propensity to lower the refractive index of glass relative to pure, undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants that are not downdopants may be present in a region of an optical fiber having a negative relative refractive index.

As used herein, the "effective area" $A_{eff}$ of an optical fiber is the area of the optical fiber in which light is propagated and is defined as:

$$A_{eff} = 2\pi \frac{\left(\int_0^\infty E^2 r dr\right)^2}{\int_0^\infty E^4 r dr},$$

where E is the electric field associated with light propagated in the fiber and r is the radius of the fiber. The effective area $A_{eff}$ is determined at a wavelength of 1550 nm, unless otherwise specified.

Mode field diameter (MFD) is a measure of the spot size or beam width of light propagating in a single mode fiber. The MFD is a function of the source wavelength, fiber core radius and fiber refractive index profile. The MFD is measured using the Peterman II method, where:

$$MFD = 2w, \text{ and}$$

$$w^2 = 2 \frac{\int_0^\infty E^2 r dr}{\int_0^\infty (dE/dr)^2 r dr} r dr$$

wherein E is the electric field distribution in the fiber and r is the radius of the fiber.

The normalized wave number, or V-number of a fiber, is defined as $V = k \cdot R_1 \cdot NA$, where k is the free space wave number, $2\lambda/\lambda$, λ is the wavelength, $R_1$ is the radius of the core, and NA is the numerical aperture of the fiber. The NA is given by $(n_{core}^2 - n_{clad}^2)^{1/2} = n_{clad}[2\Delta_{1MAX}/(1 - 2\Delta_{1MAX})]^{1/2}$, where $n_{core}$ is the maximum refractive indices of the core, $n_{clad}$ is the refractive index of the cladding and $\Delta_{1MAX}$ is the maximum relative refractive index of the core with respect to the cladding.

Chromatic dispersion or dispersion of a fiber is the sum of the material dispersion, the waveguide dispersion, and the inter-modal dispersion.

The cutoff wavelength of a mode is the minimum wavelength beyond which a mode ceases to propagate in the optical fiber. The cutoff wavelength of a single mode fiber is the minimum wavelength at which an optical fiber will support only one propagating mode. The cutoff wavelength of a single mode fiber corresponds to the highest cutoff wavelength among the higher order modes. Typically the highest cutoff wavelength corresponds to the cutoff wavelength of the LP11 mode. A mathematical definition can be found in Single Mode Fiber Optics, Jeunhomme, pp. 39 44, Marcel Dekker, New York, 1990, wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The cabled cutoff wavelength, or "cabled cutoff" can be approximated by the 22 m cabled cutoff test described in EIA-455-170 Cable Cutoff Wavelength of Single-mode Fiber by Transmitted Power, or "FOTP-170". Cable cutoff, as used herein, means the value obtained using the approximated test. The cabled cutoff wavelength is typically 100 to 300 nm lower than the theoretical cutoff wavelength.

As used herein, the term "few moded fiber" refers to a fiber supporting the propagation of more modes than a single mode fiber but fewer modes than a normal multimode fiber. The number of propagating modes and their characteristics in a cylindrically symmetric optical fiber with an arbitrary refractive index profile is obtained by solving the scalar wave equation (see for example T. A. Lenahan, "Calculation of modes in an optical fiber using a finite element method and EISPACK," Bell Syst. Tech. J., vol. 62, no. 1, p. 2663, February 1983). Light travelling in an optical fiber or other dielectric waveguide forms hybrid-type modes, which are usually referred to as LP (linear polarization) modes. The LP0$p$ modes have two polarization degrees of freedom and are two-fold degenerate, the LP1$p$ modes are four-fold degenerate and the LPmp modes with m>1 are four-fold degenerate. We do not count these degeneracies when we designate the number of LP modes propagating in the fiber. For example, an optical fiber in which only the LP01 mode propagates is a single-mode fiber, even though the LP01 mode has two possible polarizations. A few-moded optical fiber in which the L01 and LP11 modes propagate supports three spatial modes since the LP11 mode is two-fold degenerate, and each mode also has two possible polarizations, giving a total of 6 modes. Thus, when a fiber is said to have two LP modes, it is meant that it supports the propagation of all of the LP01 modes and LP11 modes.

The bend resistance or bend performance of an optical fiber may be measured by the induced attenuation of light propagating through the fiber under prescribed test conditions. The bend performance of the optical fibers described herein was modeled based on a pin array bend test to compare the relative resistance of the optical fibers to bending. To perform this test, attenuation is measured for an optical fiber with essentially no induced bending loss. The optical fiber is then woven about the pin array and the attenuation is once again measured. The loss induced by bending, typically expressed in units of dB, is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The optical fiber is caused to pass on opposite sides of adjacent pins. During testing, the optical fiber is placed under a tension sufficient to make the optical fiber conform to the portion of the periphery of the pins contacted by the fiber. The test pertains to macro-bend resistance of the optical fiber.

The term "α-profile" or "alpha profile," as used herein, refers to a relative refractive index profile, expressed in terms of Δ which is in units of "%", where r is the radius and which follows the equation:

$$\Delta = \Delta_0\left[1 - \left(\frac{r}{r_0}\right)^\alpha\right],$$

where $\Delta_0$ is the maximum relative refractive index, $r_0$ is the radius of the core, r is in the range $r_i \leq r \leq r_f$, Δ is as defined above, $r_i$ is the initial point of the α-profile, $r_f$ is the final point of the α-profile, and α is a real number exponent. For a step index profile, the alpha value is greater than or equal to 10. For a graded index profile, the alpha value is less than 10. The term "parabolic," as used herein, includes substantially parabolically shaped refractive index profiles with α=2 as well as profiles in which the curvature of the core varies slightly from α=2 at one or more points in the core, e.g. profiles having a centerline dip. It is noted here that different forms for the core radius and maximum relative refractive index are used in the examples below without affecting the fundamental definition of delta (Δ).

Unless otherwise specified herein, the above-referenced properties of the optical fiber disclosed herein and discussed below are modeled or measured at 1550 nm.

In the discussion below, any portion of the optical fiber that is not the core is considered part of the cladding. Also, the relative refractive index of a given region Y of fiber 10 is described generally as a function of radius $\Delta_Y(r)$, and in certain cases can have a maximum $\Delta_{YMAX}$ and/or a minimum $\Delta_{YMIN}$. In examples where $\Delta_Y(r)$ is constant, then $\Delta_Y(r) = \Delta_{YMAX} = \Delta YMIN$ and is referred to as $\Delta_Y$.

FIG. 1 is a side view of a section of a few mode optical fiber ("fiber") 10 according to the disclosure. The various example embodiments of fiber 10 are now described below with respect to example cross-sectional views of fiber 10 and plots of the corresponding example relative refractive index profiles.

First Main Example Embodiment

Figure 2A:
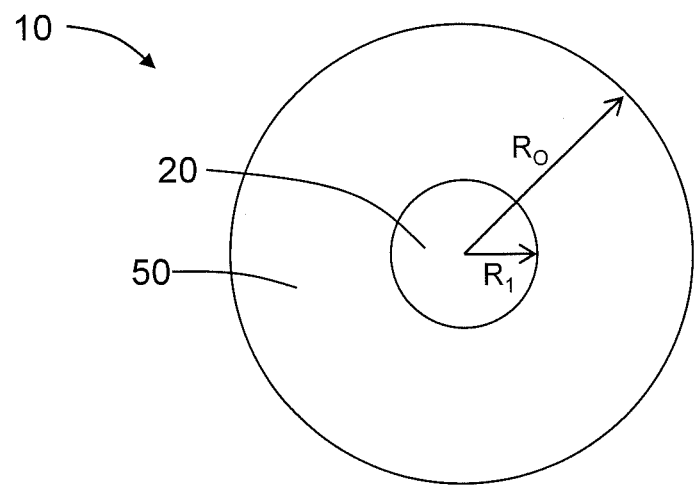
FIG. 2A is a cross-sectional view of the few mode fiber of FIG. 1 taken along the line A-A and illustrates a configuration for a first main example embodiment of the few mode optical fiber disclosed herein.
Figure 2B:
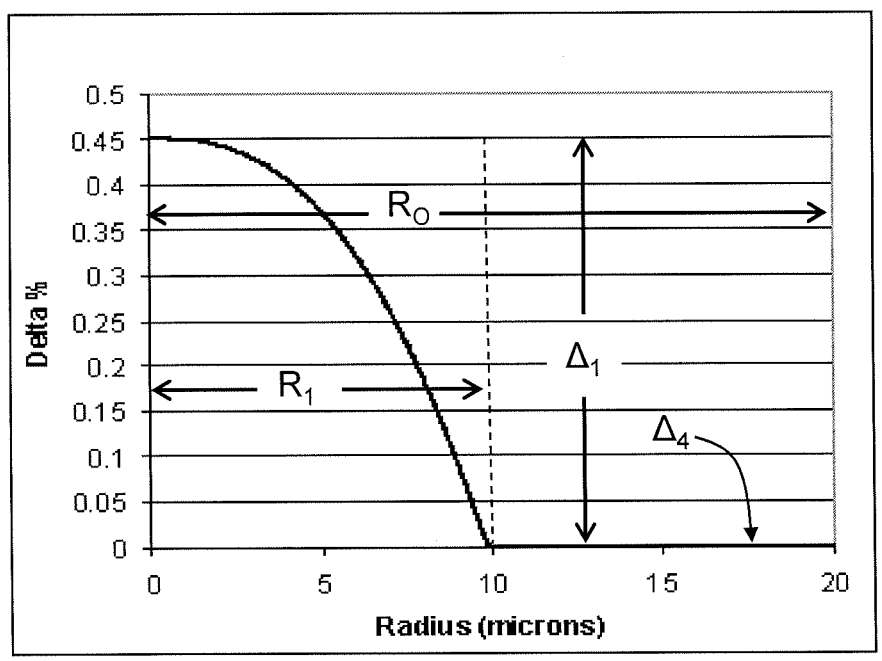
FIG. 2B plots the relative refractive index profile of the few mode optical fiber of FIG. 2A.

FIG. 2A is a cross-sectional view of fiber 10 taken along the line A-A in FIG. 1 and illustrates a first main example embodiment of fiber 10. FIG. 2B is the relative refractive index profile corresponding to the cross-section of FIG. 2A. Fiber 10 of this first example embodiment includes a glass graded-index core 20 of radius $R_1$ and a glass cladding 50 surrounding the core and begins at radius $R_1$ and extends out to an outer radius $R_O$. Cladding 50 has a substantially uniform refractive index and a relative refractive index $\Delta_4 = 0$.

In the embodiments shown and described herein, core 20 comprises pure silica glass ($SiO_2$) or silica glass with one or more dopants that increase the index of refraction of the glass core relative to pure, undoped silica glass. Suitable dopants for increasing the index of refraction of the core include, without limitation, $GeO_2$, $Al_2O_3$, $P_2O_5$, $TiO_2$, $ZrO_2$, $Nb_2O_5$, $Ta_2O_5$, and/or combinations thereof.

Table 1 below sets forth seven examples (EX1 through EX7) within this first main example embodiment, where the seven examples have a value for a between 2.3 and 2.7. The optical properties are all modeled at a wavelength of 1550 nm, unless otherwise indicated. In an example, the magnitude of the relative delay of the LP11 mode is less than 0.25 ns/km, in another example the magnitude of the relative delay of the LP11 mode is less than 0.1 ns/km, and in another example the magnitude of the relative delay of the LP11 mode is less than 0.05 ns/km. In an example, the magnitude of the relative delay of the LP11 mode is less than 0.5 ns/km at all wavelengths between 1500 and 1600 nm. In another example, the magnitude of the relative delay of the LP11 mode is less than 0.3 ns/km at all wavelengths between 1500 and 1600 nm. In another example, the magnitude of the relative delay of the LP11 mode is less than 0.2 ns/km at all wavelengths between 1500 and 1600 nm. In an example, the effective area $A_{\mathit{eff}}$ is between 100 and 150 µm², and in another example is between 110 and 140 µm².

In an example, the pin array bend loss of the LP11 mode is less than 30 dB, in another example is less than 20 dB. In an example, the cutoff wavelength of the LP02 mode is less than 1800 nm, in another example is less than 1750 nm and in another example is less than 1750 nm and greater than 1600 nm. In these examples, the cabled cutoff wavelength of the LP02 mode is approximately 300 nm lower than the theoretical cutoff wavelength of the LP02 mode. In an example, the cutoff wavelength of the LP11 mode is greater than 2400 nm, in another example is greater than 2500 nm and in another example is greater than 2600 nm.

In an example, the attenuation of the LP01 mode is less than 0.21 dB/km, in another example is less than 0.20 dB/km and in another example is less than 0.19 dB/km. In an example, the attenuation of the LP11 mode is less than 0.25 dB/km, in another example is less than 0.23 dB/km and in another example is less than 0.21 dB/km. The comparative example ("CE") has a parabolic-index core with α=2.0, yielding a relative delay of 0.76 ns/km at 1550 nm, which is too large for practical use in MDM optical transmission systems. These optical properties are all modeled at a wavelength of 1550 nm, unless otherwise indicated.

TABLE 1

Examples EX 1 through EX 7

|  | EX 1 | EX 2 | EX 3 | EX 4 | EX 5 | EX 6 | EX 7 | CE |
|---|---|---|---|---|---|---|---|---|
| $\Delta_{1MAX}$% | 0.418 | 0.418 | 0.418 | 0.418 | 0.418 | 0.418 | 0.418 | 0.418 |
| $R_1$ (µm) | 10.54 | 10.54 | 10.54 | 10.54 | 10.54 | 10.54 | 10.54 | 10.54 |
| α | 2.317 | 2.367 | 2.417 | 2.467 | 2.517 | 2.567 | 2.617 | 2.0 |
| V-Number | 5.67 | 5.67 | 5.67 | 5.67 | 5.67 | 5.67 | 5.67 | 5.67 |
| LP01 Attenuation, 1550 nm (dB/km) | 0.184 | 0.184 | 0.184 | 0.184 | 0.184 | 0.184 | 0.184 | 0.184 |
| LP11 Attenuation, 1550 nm dB/km) | 0.200 | 0.200 | 0.200 | 0.200 | 0.200 | 0.200 | 0.200 | 0.200 |
| LP01 $A_{\mathit{eff}}$ 1550 nm (µm²) | 129.9 | 130.6 | 131.4 | 132.1 | 132.8 | 133.6 | 134.3 | 125.3 |
| LP11 $A_{\mathit{eff}}$ 1550 nm (µm²) | 263.2 | 262.7 | 262.3 | 261.9 | 261.5 | 261.1 | 260.9 | 268.4 |
| LP01 MFD, 1550 nm (µm) | 12.84 | 12.87 | 12.90 | 12.92 | 12.95 | 12.98 | 13.00 | 12.68 |
| LP11 MFD, 1550 nm (µm) | 13.11 | 13.08 | 13.05 | 13.03 | 13.01 | 12.99 | 12.97 | 13.33 |
| LP11 Cutoff (µm) | 2.562 | 2.576 | 2.589 | 2.602 | 2.615 | 2.628 | 2.640 | 2.464 |
| LP02 Cutoff (µm) | 1.742 | 1.748 | 1.755 | 1.761 | 1.767 | 1.772 | 1.778 | 1.696 |
| LP21 Cutoff (µm) | 1.577 | 1.586 | 1.595 | 1.603 | 1.611 | 1.620 | 1.628 | 1.514 |
| LP01 Pin Array, 1550 nm (dB) | 0.00 | 0.00 | 0.00 | 0.00 | 0.00 | 0.00 | 0.00 | 0.00 |
| LP11 Pin Array, 1550 nm (dB) | 18.00 | 16.29 | 14.77 | 13.42 | 12.22 | 11.15 | 10.20 | 35.73 |
| LP01 Dispersion, 1550 nm (ps/nm/km) | 21.08 | 21.12 | 21.16 | 21.19 | 21.22 | 21.26 | 21.30 | 20.79 |
| LP11 Dispersion, 1550 nm (ps/nm/km) | 19.38 | 19.44 | 19.49 | 19.55 | 19.60 | 19.66 | 19.71 | 18.95 |
| LP01 Effective Index | 1.46873 | 1.46875 | 1.46877 | 1.46878 | 1.46880 | 1.46881 | 1.46883 | 1.46859 |
| LP11 Effective Index | 1.46865 | 1.46870 | 1.46874 | 1.46877 | 1.46881 | 1.46884 | 1.46888 | 1.46834 |
| LP11 Delay, 1500 nm (ns/km) | −0.10 | −0.02 | 0.05 | 0.11 | 0.18 | 0.24 | 0.30 | −0.63 |
| LP11 Delay, 1550 nm (ns/km) | −0.20 | −0.12 | −0.05 | −0.02 | 0.09 | 0.16 | 0.22 | −0.76 |
| LP11 Delay, 1600 nm (ns/km) | −0.32 | −0.24 | −0.16 | −0.08 | −0.01 | 0.06 | 0.13 | −0.91 |

Table 2 below sets forth seven more examples (EX8 through EX14) of this first main example embodiment where the value for a is between 2.3 and 2.7. In an example, the magnitude of the relative delay is less than 0.25 ns/km, in another example is less than 0.1 ns/km, and in another example is less than 0.05 ns/km. In an example, the magnitude of the relative delay of the LP11 mode is less than 0.3 ns/km at all wavelengths between 1500 and 1600 nm. In another example, the magnitude of the relative delay of the LP11 mode is less than 0.2 ns/km at all wavelengths between 1500 and 1600 nm. In another example, the magnitude of the relative delay of the LP11 mode is less than 0.15 ns/km at all wavelengths between 1500 and 1600 nm. In an example, the effective area $A_{eff}$ is between 90 and 160 μm², and in another example is between 100 and 150 μm². In an example, the pin array bend loss of the LP11 mode is less than 60 dB, in another example is less than 30 dB, and in another example is less than 20 dB.

In an example, the cutoff wavelength of the LP02 mode is less than 1800 nm, in another example is less than 1750 nm and in another example is less than 1750 nm and greater than 1600 nm. In these examples, the cabled cutoff wavelength of the LP02 mode is approximately 300 nm lower than the theoretical cutoff wavelength of the LP02 mode. In an example, the cutoff wavelength of the LP11 mode is greater than 2400 nm, in another example is greater than 2500 nm and in another example is greater than 2600 nm. In an example, the attenuation of the LP01 mode is less than 0.21 dB/km, in another example is less than 0.20 dB/km and in another example is less than 0.19 dB/km. In an example, the attenuation of the LP11 mode is less than 0.25 dB/km, in another example is less than 0.23 dB/km and in another example is less than 0.21 dB/km. These optical properties are all modeled at a wavelength of 1550 nm, unless otherwise indicated.

TABLE 2

Examples EX 8 through EX 14

|  | EX 8 | EX 9 | EX 10 | EX 11 | EX 12 | EX 13 | EX 14 |
|---|---|---|---|---|---|---|---|
| $\Delta_{1MAX}$% | 0.452 | 0.389 | 0.454 | 0.446 | 0.472 | 0.547 | 0.337 |
| $R_1$ (μm) | 10.29 | 10.86 | 9.85 | 9.77 | 9.33 | 8.66 | 11.37 |
| α | 2.417 | 2.467 | 2.517 | 2.567 | 2.617 | 2.617 | 2.517 |
| V-Number | 5.75 | 5.63 | 5.52 | 5.42 | 5.33 | 5.33 | 5.49 |
| LP01 Attenuation, 1550 nm (dB/km) | 0.184 | 0.183 | 0.185 | 0.185 | 0.185 | 0.186 | 0.183 |
| LP11 Attenuation, 1550 nm (dB/km) | 0.201 | 0.198 | 0.202 | 0.202 | 0.204 | 0.209 | 0.196 |
| LP01 $A_{eff}$, 1550 nm (μm²) | 123.3 | 141.1 | 118.9 | 119.5 | 111.4 | 95.9 | 159.5 |
| LP11 $A_{eff}$, 1550 nm (μm²) | 245.1 | 280.2 | 236.1 | 237.2 | 221.0 | 190.5 | 317.3 |
| LP01 MFD, 1550 nm (μm) | 12.49 | 13.36 | 12.26 | 12.29 | 11.86 | 11.00 | 14.20 |
| LP11 MFD, 1550 nm (μm) | 12.61 | 13.49 | 12.39 | 12.42 | 12.00 | 11.14 | 14.37 |
| LP11 Cutoff (μm) | 2.629 | 2.586 | 2.548 | 2.517 | 2.485 | 2.484 | 2.532 |
| LP02 Cutoff (μm) | 1.781 | 1.750 | 1.721 | 1.698 | 1.674 | 1.673 | 1.710 |
| LP21 Cutoff (μm) | 1.619 | 1.593 | 1.570 | 1.552 | 1.532 | 1.532 | 1.561 |
| LP01 Pin Array, 1550 nm (dB) | 0.00 | 0.01 | 0.00 | 0.00 | 0.00 | 0.00 | 0.24 |
| LP11 Pin Array, 1550 nm (dB) | 7.11 | 22.57 | 9.38 | 11.92 | 9.18 | 2.87 | 56.57 |
| LP01 Dispersion, 1550 nm (ps/nm/km) | 21.12 | 21.24 | 21.12 | 21.14 | 21.09 | 20.96 | 21.32 |
| LP11 Dispersion, 1550 nm (ps/nm/km) | 19.46 | 19.66 | 19.10 | 18.99 | 18.64 | 18.11 | 19.77 |
| LP01 Effective Index | 1.46927 | 1.46835 | 1.46934 | 1.46923 | 1.46964 | 1.47077 | 1.46759 |
| LP11 Effective Index | 1.46925 | 1.46834 | 1.46932 | 1.46921 | 1.46961 | 1.47074 | 1.46757 |
| LP11 Delay, 1500 nm (ns/km) | 0.092 | 0.089 | 0.112 | 0.120 | 0.137 | 0.154 | 0.069 |
| LP11 Delay, 1550 nm (ns/km) | −0.001 | 0.001 | 0.000 | 0.000 | 0.000 | −0.006 | −0.017 |
| LP11 Delay, 1600 nm (ns/km) | −0.108 | −0.103 | −0.134 | −0.142 | −0.163 | −0.196 | −0.120 |

Table 3 below sets forth four more examples (EX15 through EX18) of this first main example embodiment where the value for a is between 2.3 and 10.0. In an example, the value for α is between 2.3 and 5.0. In another example, the value for α is between 2.3 and 3. In an example, the magnitude of the relative delay is less than 0.25 ns/km, in another example is less than 0.1 ns/km, and in another example is less than 0.05 ns/km. In an example, the magnitude of the relative delay of the LP11 mode is less than 0.5 ns/km at all wavelengths between 1500 and 1600 nm. In another example, the magnitude of the relative delay of the LP11 mode is less than 0.3 ns/km at all wavelengths between 1500 and 1600 nm. In another example, the magnitude of the relative delay of the LP11 mode is less than 0.2 ns/km at all wavelengths between 1500 and 1600 nm.

In an example, the effective area $A_{eff}$ is between 90 and 160 μm², and in another example is between 100 and 150 μm². In an example, the pin array bend loss of the LP11 mode is less than 100 dB, in another example is less than 30 dB, and in another example is less than 20 dB. In an example, the cutoff wavelength of the LP02 mode is less than 1800 nm, in another example is less than 1750 nm and in another example is less than 1750 nm and greater than 1600 nm. In these examples, the cabled cutoff wavelength of the LP02 mode is approximately 300 nm lower than the theoretical cutoff wavelength of the LP02 mode. In an example, the cutoff wavelength of the LP11 mode is greater than 2000 nm, in another example is greater than 2200 nm and in another example is greater than 2400 nm. In an example, the attenuation of the LP01 mode is less than 0.21 dB/km, in another example is less than 0.20 dB/km and in another example is less than 0.19 dB/km. In an example, the attenuation of the LP11 mode is less than 0.25 dB/km, in another example is less than 0.23 dB/km and in another example is less than 0.21 dB/km. These optical properties are all modeled at a wavelength of 1550 nm, unless otherwise indicated.

TABLE 3

Examples EX15 through EX18

|  | EX 15 | EX 16 | EX 17 | EX 18 |
|---|---|---|---|---|
| $\Delta_{1MAX}$% | 0.400 | 0.400 | 0.500 | 0.500 |
| $R_1$ (μm) | 7.50 | 10.70 | 8.30 | 9.50 |
| A | 5 | 2.5 | 3 | 2.5 |
| V-Number | 3.94 | 5.62 | 4.88 | 5.59 |
| LP01 Attenuation, 1550 nm (dB/km) | 0.187 | 0.184 | 0.186 | 0.185 |
| LP11 Attenuation, 1550 nm (dB/km) | 0.209 | 0.199 | 0.209 | 0.205 |
| LP01 $A_{eff}$, 1550 nm (μm²) | 108.7 | 137.6 | 99.0 | 109.1 |
| LP11 $A_{eff}$, 1550 nm (μm²) | 213.1 | 272.1 | 195.2 | 216.3 |
| LP01 MFD, 1550 nm (μm) | 11.60 | 13.18 | 11.15 | 11.74 |
| LP11 MFD, 1550 nm (μm) | 11.83 | 13.28 | 11.29 | 11.85 |
| LP11 Cutoff (μm) | 2.092 | 2.592 | 2.349 | 2.575 |
| LP02 Cutoff (μm) | 1.354 | 1.752 | 1.567 | 1.741 |
| LP21 Cutoff (μm) | 1.303 | 1.597 | 1.452 | 1.586 |
| LP01 Pin Array, 1550 nm (dB) | 0.001 | 0.000 | 0.000 | 0.000 |
| LP11 Pin Array, 1550 nm (dB) | 99.8 | 18.2 | 11.0 | 3.9 |
| LP01 Dispersion, 1550 nm (ps/nm/km) | 21.27 | 21.24 | 21.09 | 21.05 |
| LP11 Dispersion, 1550 nm (ps/nm/km) | 15.25 | 19.61 | 17.39 | 18.94 |
| LP01 Effective Index | 1.46893 | 1.46852 | 1.47018 | 1.47002 |
| LP11 Effective Index | 1.46890 | 1.46852 | 1.47016 | 1.47000 |
| LP11 Delay, 1500 nm (ns/km) | 0.44 | 0.13 | 0.27 | 0.14 |
| LP11 Delay, 1550 nm (ns/km) | 0.09 | 0.04 | 0.06 | 0.03 |
| LP11 Delay, 1600 nm (ns/km) | −0.31 | −0.06 | −0.18 | −0.11 |

Second Main Example Embodiment

Figure 3A:
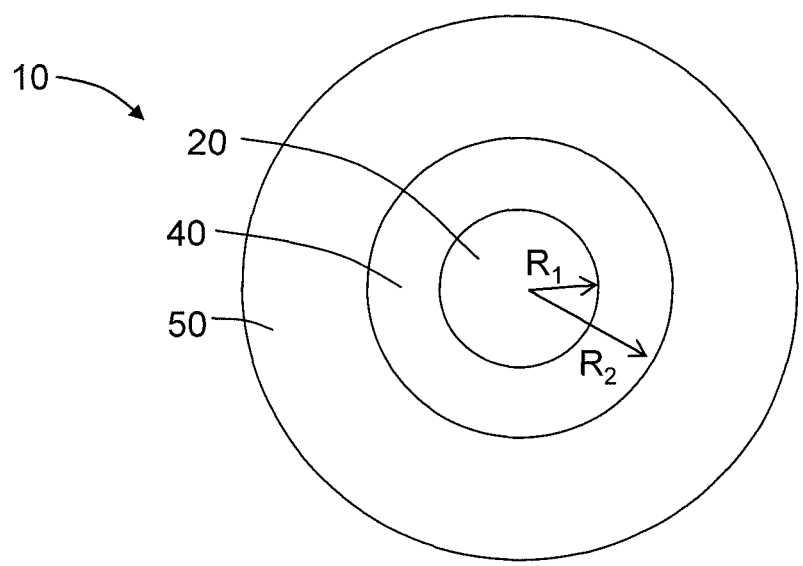
FIG. 3A cross-sectional view taken of the few mode fiber of FIG. 1 along the line A-A and illustrates a configuration for a second main example embodiment of the few mode optical fiber disclosed herein.
Figure 3B:
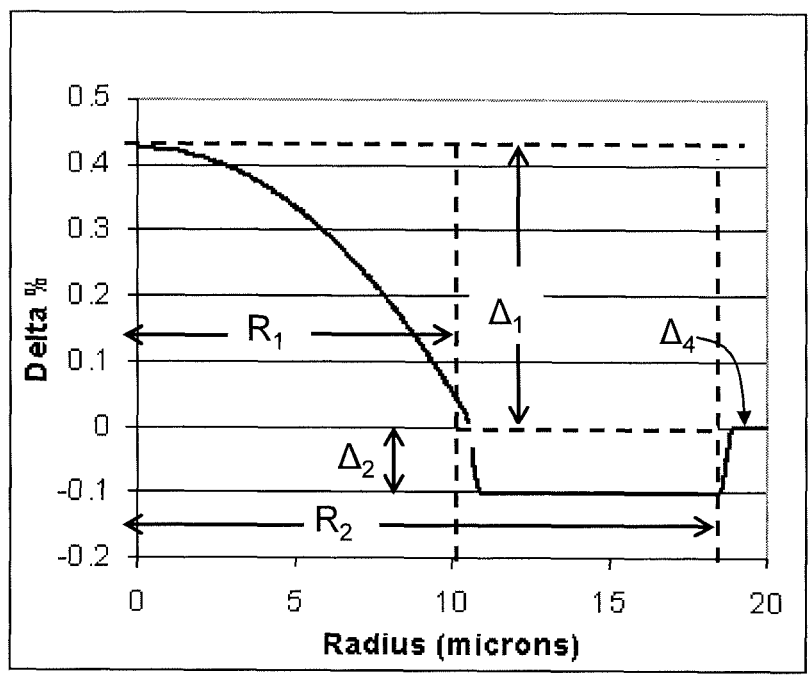
FIG. 3B plots the relative refractive index profile of the optical fiber of FIG. 3A.

FIG. 3A is a cross-sectional view of fiber 10 taken along the line A-A in FIG. 1 and illustrates a second main example embodiment of fiber 10. FIG. 3B is the relative refractive index profile corresponding to the cross-section of FIG. 3A. Fiber 10 of this second example embodiment includes a low-index ring 40 disposed immediately adjacent and surrounding the graded-index glass core 20. Cladding 50 immediately surrounds ring 40. Ring 40 has an inner radius $R_1$, an outer radius $R_2$, a relative refractive index $\Delta_2$, and a minimum relative refractive index $\Delta_{2MIN}$. In an example, $\Delta_2=\Delta_{2MIN}$ as shown.

Table 4 below sets forth three examples EX19-EX21 of this second main example embodiment. The examples have a value for α between 1.9 and 2.1. The minimum relative refractive index $\Delta_{2MIN}$ of low-index ring 40 is less than 0, and in these examples, $\Delta_{2MIN}<-0.05\%$. In an example, the outer radius $R_2$ of low-index ring 40 is greater than 12 μm, in another example is greater than 14 μm and in another example is greater than 16 μm. In an example, the magnitude of the relative delay is less than 0.25 ns/km, in another example is less than 0.1 ns/km, and in another example is less than 0.05 ns/km. In an example, the magnitude of the relative delay of the LP11 mode is less than 0.3 ns/km at all wavelengths between 1500 and 1600 nm. In another example, the magnitude of the relative delay of the LP11 mode is less than 0.2 ns/km at all wavelengths between 1500 and 1600 nm. In another example, the magnitude of the relative delay of the LP11 mode is less than 0.1 ns/km at all wavelengths between 1500 and 1600 nm.

In an example, the effective area $A_{eff}$ is between 90 μm² and 160 μm², in another example is between 100 μm² and 150 μm². In an example, the pin array bend loss of the LP11 mode is less than 60 dB, in another example is less than 30 dB, and in another example is than 20 dB. In an example, the cutoff wavelength of the LP02 mode is preferable less than 1600 nm, in another example is less than 1550 nm and in another example is less than 1550 nm and greater than 1400 nm. In these examples, the cabled cutoff wavelength of the LP02 mode is approximately 100 nm lower than the theoretical cutoff wavelength of the LP02 mode. In an example, the cutoff wavelength of the LP11 mode is greater than 2000 nm and in another example is greater than 2200 nm. These optical properties are all modeled at a wavelength of 1550 nm, unless otherwise indicated.

TABLE 4

Examples EX19-EX21

|  | EX19 | EX20 | EX21 |
|---|---|---|---|
| $\Delta_{1MAX}$% | 0.391 | 0.433 | 0.458 |
| $R_1$ (μm) | 10.75 | 10.65 | 10.36 |
| A | 2.05 | 2.05 | 2.05 |
| $\Delta_{2MIN}$% | −0.1 | −0.1 | −0.1 |
| $R_2$ (μm) | 10.75 | 10.65 | 10.36 |
| $R_3$ (μm) | 18.75 | 18.65 | 18.36 |
| V-Number | 5.58 | 5.82 | 5.83 |
| LP01 Attenuation, 1550 nm (dB/km) | 0.184 | 0.184 | 0.184 |
| LP11 Attenuation, 1550 nm (dB/km) | 0.199 | 0.200 | 0.202 |
| LP01 $A_{eff}$, 1550 nm (μm²) | 131.3 | 123.7 | 117.0 |
| LP11 $A_{eff}$, 1550 nm (μm²) | 262.9 | 247.7 | 234.8 |
| LP01 MFD, 1550 nm (μm) | 12.92 | 12.54 | 12.20 |
| LP11 MFD, 1550 nm (μm) | 12.98 | 12.59 | 12.27 |
| LP11 Cutoff (μm) | 2.198 | 2.304 | 2.311 |
| LP02 Cutoff (μm) | 1.443 | 1.510 | 1.514 |
| LP21 Cutoff (μm) | 1.441 | 1.505 | 1.508 |
| LP01 Pin Array, 1550 nm (dB) | 0.00 | 0.00 | 0.00 |
| LP11 Pin Array, 1550 nm (dB) | 42.00 | 15.95 | 11.18 |
| LP01 Dispersion, 1550 nm (ps/nm/km) | 21.24 | 21.16 | 21.10 |

TABLE 4-continued

Examples EX19-EX21

|  | EX19 | EX20 | EX21 |
|---|---|---|---|
| LP11 Dispersion, 1550 nm (ps/nm/km) | 20.65 | 20.64 | 20.50 |
| LP01 Effective Index | 1.46826 | 1.46887 | 1.46923 |
| LP11 Effective Index | 1.46825 | 1.46886 | 1.46921 |
| LP11 Delay, 1500 nm (ns/km) | 0.02 | 0.023 | 0.005 |
| LP11 Delay, 1550 nm (ns/km) | −0.008 | −0.002 | −0.025 |
| LP11 Delay, 1600 nm (ns/km) | −0.047 | −0.036 | −0.064 |

Third Main Example Embodiment

Figure 4A:
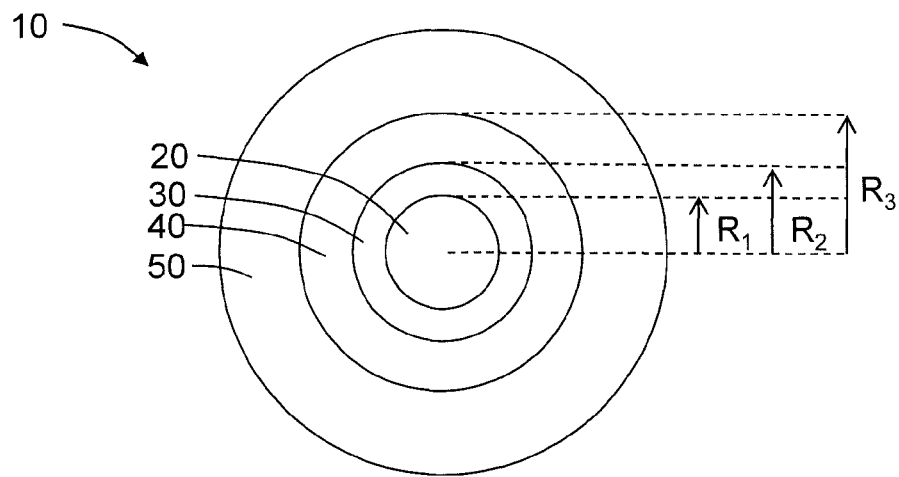
FIG. 4A cross-sectional view of the few mode fiber of FIG. 1 taken along the line A-A and illustrates a configuration for a second main example embodiment of the few mode optical fiber disclosed herein.
Figure 4B:
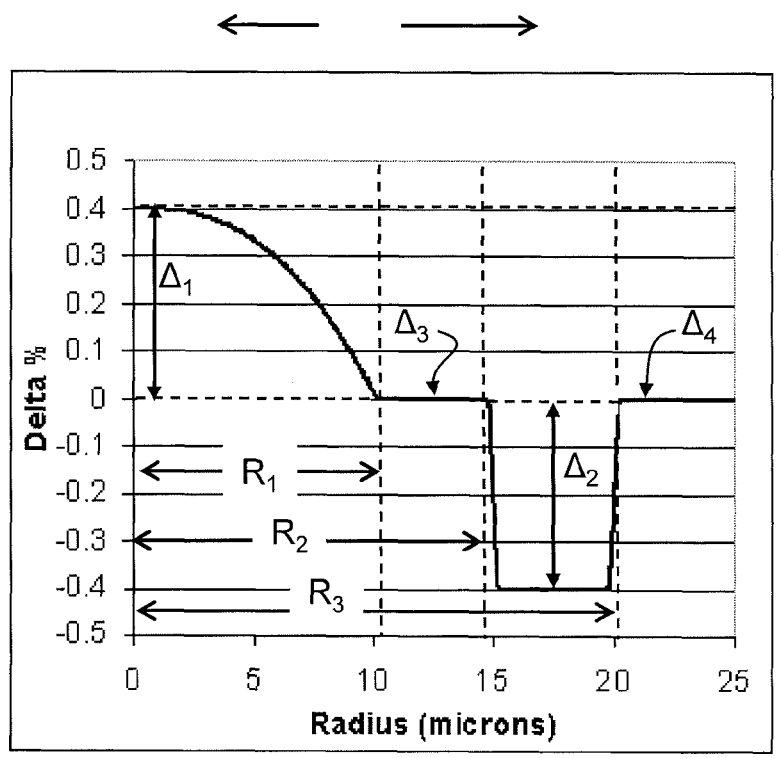
FIG. 4B plots the relative refractive index profile of the few mode optical fiber of FIG. 4A.
Figure 4C:
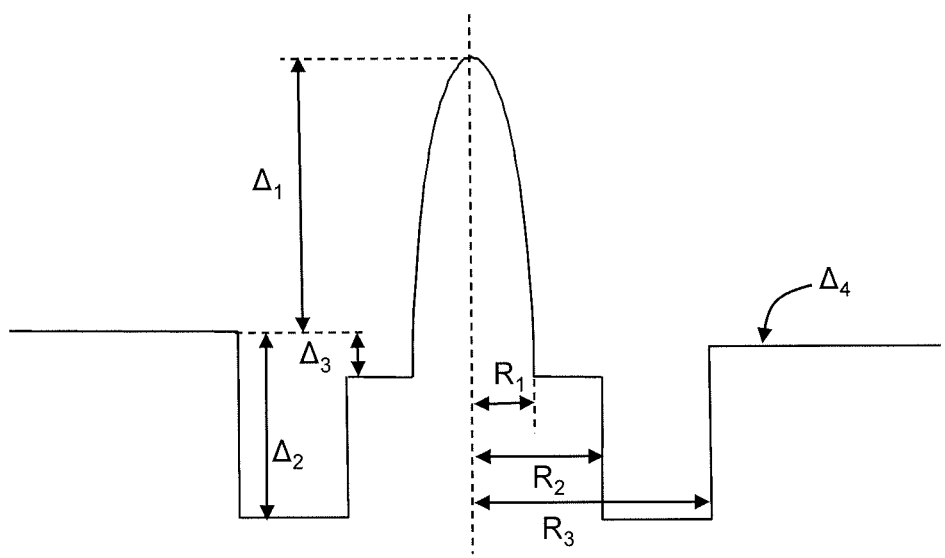
FIG. 4C is similar to FIG. 4B, except that the relative refractive index profile includes the outer cladding having a higher relative refractive index than the inner cladding.

FIG. 4A is a cross-sectional view of fiber 10 taken along the line A-A in FIG. 1 and illustrates a third main example embodiment of fiber 10. FIG. 4B plots an example refractive index profile corresponding to the cross-section of FIG. 4A, while FIG. 4C plots another example relative refractive index profile. Fiber 10 of this third example embodiment is similar to that of the second example embodiment except that it further includes an inner cladding 30 between core 20 and ring 40. Inner cladding 30 thus surrounds core 20 so that ring 40 is no longer in contact with (i.e., is no longer immediately adjacent) core 20. Inner cladding 30 has an inner radius $R_1$ and an outer radius $R_2$, and low-index ring 40 now has an inner radius $R_2$, an outer radius $R_3$ and a radial width $R_3-R_2$. Inner cladding 30 has a radial width $R_2-R_1$. In an example, inner cladding has a relative refractive $\Delta_3 = \Delta_4 = 0$.

In an example, inner cladding 30 may be formed like cladding 50 in that it may comprise pure silica glass ($SiO_2$), silica glass with one or more dopants that increase the index of refraction (e.g., $GeO_2$, $Al_2O_3$, $P_2O_5$, $TiO_2$, $ZrO_2$, $Nb_2O_5$ and/or $Ta_2O_5$), such as when the cladding is "up-doped," or silica glass with a dopant which decreases the index of refraction, such as fluorine, such as when the inner cladding is "down-doped"

Table 5 below sets forth six examples EX22 through EX27 of this third main example embodiment of fiber 10. Examples EX22 through EX26 comprise a graded index core 20 with a value for α between 2.3 and 2.7. Example 27 comprises a graded-index core 20 with a value for α between 1.9 and 2.1. In an example, the minimum relative refractive index $\Delta_{2MIN}$ of low-index ring 40 is less than −0.1%, in another example $\Delta_{2MIN} \leq -0.2\%$, in another example, $\Delta_{2MIN} \leq -0.3\%$, and in another example $-0.7\% \leq \Delta_{2MIN} \leq -0.3\%$. In an example, the outer radius $R_3$ of low-index ring 40 is greater than 14 μm, in another example the outer radius $R_3$ is greater than 16 μm and in another example the outer radius $R_3$ is greater than 18 μm. In an example, the inner radius $R_2$ of low-index ring 40 is greater than 12 μm, in another example $R_2$ is greater than 14 μm and in another example $R_2$ is greater or equal to 16 μm. In an example, the radial width of low-index ring 40 as defined by $R_3-R_2$, is greater than 2 μm, in another example is greater than 3 μm and in another example is greater than 4 μm.

In an example embodiment, the magnitude of the relative delay is less than 0.25 ns/km, in another example is less than 0.1 ns/km, and in another example is less than 0.05 ns/km. In an example, the magnitude of the relative delay of the LP11 mode is less than 0.5 ns/km at all wavelengths between 1500 and 1600 nm. In another example, the magnitude of the relative delay of the LP11 mode is less than 0.3 ns/km at all wavelengths between 1500 and 1600 nm. In another example, the magnitude of the relative delay of the LP11 mode is less than 0.2 ns/km at all wavelengths between 1500 and 1600 nm.

In an example, the effective area $A_{eff}$ is between 90 μm² and 160 μm², and in another example is between 100 μm² and 150 μm². In an example, the pin array bend loss of the LP11 mode is less than 60 dB, in another example is less than 30 dB, and in another example is than 20 dB. In an example, the cutoff wavelength of the LP02 mode is less than 1600 nm, in another example is less than 1550 nm and in another example is less than 1550 nm and greater than 1400 nm. In these examples, the cabled cutoff wavelength of the LP02 mode is approximately 100 nm lower than the theoretical cutoff wavelength of the LP02 mode. In an example, the cutoff wavelength of the LP11 mode is greater than 2000 nm, in another embodiment is greater than 2200 nm and in another example is greater than 2400 nm. These optical properties are all modeled at a wavelength of 1550 nm, unless otherwise indicated.

TABLE 5

Examples EX 22-EX 27

|  | EX 22 | EX 23 | EX 24 | E 25 | EX 26 | EX 27 |
|---|---|---|---|---|---|---|
| $\Delta_{1MAX}\%$ | 0.405 | 0.364 | 0.364 | 0.395 | 0.437 | 0.4 |
| $R_1$ (μm) | 10.13 | 10.58 | 10.58 | 9.91 | 9.70 | 10.9 |
| A | 2.517 | 2.517 | 2.517 | 2.617 | 2.517 | 2 |
| $D_{2MIN}\%$ | −0.4 | −0.4 | −0.3 | −0.4 | −0.4 | −0.4 |
| $R_2$ (μm) | 16 | 16 | 16 | 16 | 15 | 12.5 |
| $R_3$ (μm) | 20 | 20 | 20 | 20 | 20 | 18 |
| V-Number | 5.36 | 5.30 | 5.30 | 5.18 | 5.33 | 5.73 |
| LP01 Attenuation, 1550 nm (dB/km) | 0.184 | 0.183 | 0.183 | 0.184 | 0.185 | 0.184 |
| LP11 Attenuation, 1550 nm (dB/km) | 0.200 | 0.198 | 0.198 | 0.200 | 0.202 | 0.199 |
| LP01 $A_{eff}$, 1550 nm (μm²) | 129.4 | 142.5 | 142.5 | 129.2 | 119.2 | 132.4 |
| LP11 $A_{eff}$, 1550 nm (μm²) | 257.0 | 282.5 | 283.0 | 256.5 | 236.8 | 282.4 |
| LP01 MFD, 1550 nm (μm) | 12.79 | 13.42 | 13.42 | 12.78 | 12.28 | 13.03 |
| LP11 MFD, 1550 nm (μm) | 12.91 | 13.52 | 13.55 | 12.91 | 12.39 | 13.66 |
| LP11 Cutoff (μm) | 2.304 | 2.263 | 2.276 | 2.252 | 2.284 | 2.49 |
| LP02 Cutoff (μm) | 1.510 | 1.486 | 1.490 | 1.473 | 1.499 | 1.72 |

TABLE 5-continued

Examples EX 22-EX 27

|  | EX 22 | EX 23 | EX 24 | E 25 | EX 26 | EX 27 |
|---|---|---|---|---|---|---|
| LP21 Cutoff (μm) | 1.503 | 1.484 | 1.486 | 1.469 | 1.494 | 1.531 |
| LP01 Pin Array, 1550 nm (dB) | 0.00 | 0.00 | 0.00 | 0.00 | 0.00 | 0.03 |
| LP11 Pin Array, 1550 nm (dB) | 16.04 | 30.24 | 33.79 | 22.27 | 9.79 | 40.09 |
| LP01 Dispersion, 1550 nm (ps/nm/km) | 21.20 | 21.28 | 21.27 | 21.22 | 21.14 | 20.86 |
| LP11 Dispersion, 1550 nm (ps/nm/km) | 19.76 | 20.16 | 20.04 | 19.59 | 19.64 | 19.20 |
| LP01 Effective Index | 1.46861 | 1.46800 | 1.46800 | 1.46849 | 1.46909 | 1.46833 |
| LP11 Effective Index | 1.46859 | 1.46799 | 1.46798 | 1.46847 | 1.46907 | 1.46811 |
| LP11 Delay, 1500 nm (ns/km) | 0.086 | 0.091 | 0.074 | 0.098 | 0.089 | 0.053 |
| LP11 Delay, 1550 nm (ns/km) | 0 | −0.022 | −0.001 | 0 | −0.001 | 0.076 |
| LP11 Delay, 1600 nm (ns/km) | −0.095 | −0.053 | −0.083 | −0.108 | −0.101 | 0.101 |

FIG. 4C illustrates a relative refractive index profile similar to that of FIG. 4B, except that is represents a more generalized version of the third main example embodiment wherein the effective refractive index $\Delta_3$ of inner cladding 30 is smaller than that of (outer) cladding 50, i.e., $\Delta_3<\Delta_4$. In an example, inner cladding 30 has a relative refractive index $\Delta_3$ between −0.1% and 0.05%. Low-index ring 40 is disposed immediately adjacent inner cladding 30 and has a starting (inner) radius of $R_2$ and an ending (outer) radius of $R_3$. Ring 40 thus has a radial width of $R_3-R_2$ and has a minimum relative refractive index $\Delta_{2MIN}$ relative to cladding 50. In an example, the minimum relative refractive index $\Delta_{2MIN}$ is between −0.1% and −0.7%, and in another example is between −0.3% and −0.5%.

In an example, the radial width $R_3-R_2$ of low-index ring 40 is between 0 μm and 15 μm, in another example is between 2 μm to 8 μm and in another example is between 4 μm to 6 μm. In an example, low-index ring 40 has an index profile other than a step profile, such as a triangular or parabolic profile that can provide additional mode-field control.

Figure 4D:
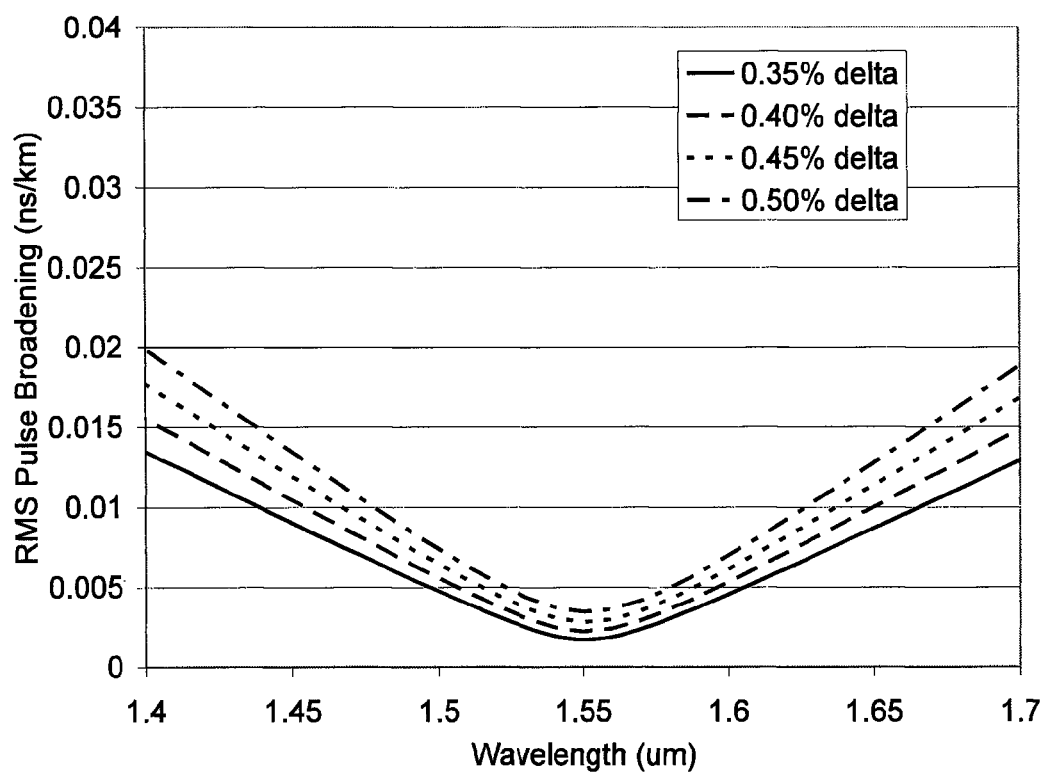
FIG. 4D plots the pulse broadening (ns/km) versus wavelength (μm) for different values of the maximum core relative refractive index $\Delta_{1MAX}$ (denoted "delta" in the legend) having optimum values of α.

FIG. 4D shows the RMS pulse broadening (ns/km) as a function of wavelength (μm) for four maximum core relative refractive index values $\Delta_{1MAX}$ (denoted by "delta" in the legend) having optimum alpha values. It can be seen that the within the wavelength window of 1.5 to 1.6 μm, the RMS broadening (which is equal to the LP11 mode delay in a two mode fiber) varies by less than 0.1 ns/km, which is suitable for MDM transmission systems.

Fourth Main Example Embodiment

Table 6 illustrates the attributes of five index profiles for which variations of the radius and alpha parameter of the core change the sign of the differential mode group delay and differential mode group delay slopes. In example 28, the trench is adjacent to the graded index core, but is spaced from the core in examples 29-32 by an offset $R_2-R_1$. The refractive index profile for Example 31 is plotted in FIG. 7. Each of embodiments 28-32 yields very low differential mode delays when made according to the prescribed dimensions. The LP01 effective area $A_{eff}$ of fibers 6-10 is greater than 120 μm², more preferably between 120 and 200 μm². In an example, the theoretical cutoff wavelength of the LP02 mode is less than 2400 nm, in another example is less than 2000 nm and in another example is less than 1800 nm. In these examples, the cabled cutoff wavelength of the LP02 mode is approximately 300 nm lower than the theoretical cutoff wavelength of the LP02 mode. In an example, the theoretical cutoff wavelength of the LP11 mode is greater than 2000 nm, in another example is greater than 2200 nm and in another example is greater than 2400 nm. In an example, the attenuation of the LP01 mode is less than 0.21 dB/km, in another example is less than 0.20 dB/km and in another example is less than 0.19 dB/km. In an example, the attenuation of the LP11 mode is less than 0.25 dB/km, in another example is less than 0.23 dB/km and in another example is less than 0.21 dB/km. These optical properties are all modeled at a wavelength of 1550 nm, unless otherwise indicated.

TABLE 6

| Example | 28 | 28 | 30 | 31 | 32 |
|---|---|---|---|---|---|
| Δ1 (%) | 0.46 | 0.46 | 0.46 | 0.46 | 0.46 |
| R1 (μm) | 11.1 | 11.1 | 11.1 | 11.1 | 11.1 |
| Alpha | 1.96 | 2.005 | 2.02 | 2.04 | 2.06 |
| R2 (μm) | 11.18 | 11.98 | 12.41 | 12.98 | 13.39 |
| Δ2 (%) | −0.15 | −0.2 | −0.25 | −0.35 | −0.45 |
| R3 (μm) | 17 | 17 | 17 | 17 | 18 |
| R1/R2 | 0.99 | 0.93 | 0.89 | 0.86 | 0.83 |
| Theoretical LP02 Cutoff (μm) | 1.591 | 1.609 | 1.613 | 1.620 | 1.626 |
| Theoretical LP11 Cutoff (μm) | 2.420 | 2.440 | 2.441 | 2.443 | 2.447 |
| LP01 Dispersion (ps/nm/km) | 21.12 | 21.10 | 21.10 | 21.09 | 21.09 |
| LP01 Effective Area (μm²) | 123.4 | 124.5 | 124.9 | 125.3 | 125.8 |
| LP01 MFD (am) | 12.53 | 12.59 | 12.61 | 12.63 | 12.65 |
| LP11 Dispersion (ps/nm/km) | 21.06 | 21.08 | 21.11 | 21.12 | 21.11 |
| LP11 Effective Area (μm²) | 123.8 | 125.0 | 125.4 | 125.9 | 126.2 |
| LP01-LP02 | 0.0106 | 0.0032 | −0.0022 | −0.0055 | 0.0011 |

TABLE 6-continued

| Example | 28 | 28 | 30 | 31 | 32 |
|---|---|---|---|---|---|
| delay at 1530 (ns/km) | | | | | |
| LP01-LP02 delay at 1550 (nm/km) | 0.0107 | 0.0032 | −0.002 | −0.0053 | 0.0011 |
| LP01-LP02 delay at 1565 (nm/km) | 0.0103 | 0.0029 | −0.002 | −0.0053 | 0.0012 |
| LP01-LP02 delay slope at (ps/nm/km) | −0.009 | −0.009 | 0.006 | 0.006 | 0.003 |

Figure 7:
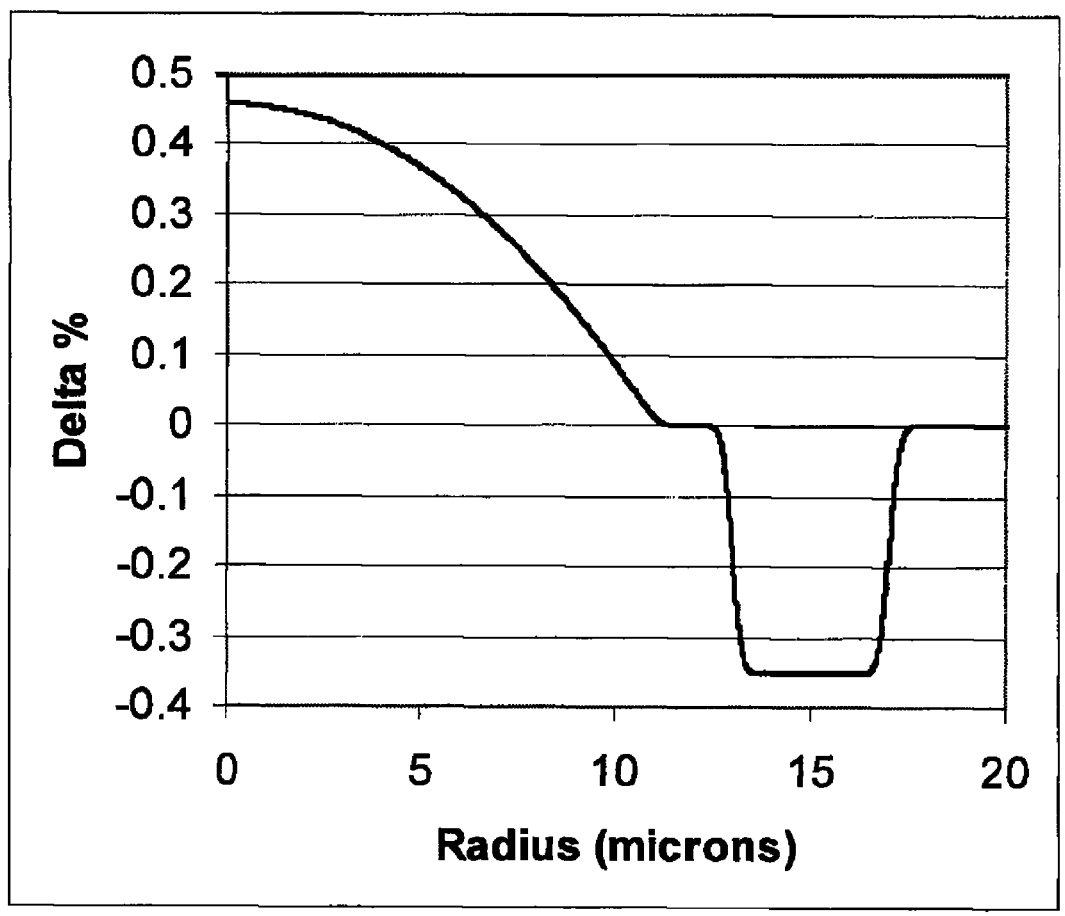
FIG. 7 illustrates a refractive index profile of an alternative few moded fiber embodiment.

Table 7 illustrates the index profiles for four variations of Example 31 in which variations of the radius and alpha parameter of the core change the sign of the differential mode group delay and differential mode group delay slopes. FIG. 7 illustrates the refractive index profile of Example 31c. Each of embodiments 31a-31d yields very low differential mode delays when made according to the prescribed dimensions. Examples 31a and 31d have similar alpha values, with $|\alpha_i-\alpha_j|<0.2$, and slightly different core radii with $|R_{1i}-R_{1j}|>0.2$ μm. Example 31a yields negative differential mode delays at 1530, 1550 and 1565 nm, with a negative differential mode delay slope, while Example 31a yields positive differential mode delays at 1530, 1550 and 1565 nm, with a positive differential mode delay slope. Combining these two modeled fiber examples in approximately a 1:1 length ratio yields a span with nearly zero differential mode delay and differential mode delay slope. Example 31b yields positive differential mode delays at 1530, 1550 and 1565 nm, with a negative differential mode delay slope, while Example 31c yields negative differential mode delays at 1530, 1550 and 1565 nm, with a positive differential mode delay slope. Combining these two modeled fiber examples in approximately a 1:1 length ratio yields a span with nearly zero differential mode delay and differential mode delay slope.

TABLE 7

| Example | 31a | 31b | 31c | 31d |
|---|---|---|---|---|
| Δ1 (%) | 0.456 | 0.465 | 0.465 | 0.466 |
| R1 (μm) | 11.01 | 11.16 | 10.89 | 11.23 |
| Alpha | 2.026 | 2.095 | 1.991 | 2.038 |
| R2 (μm) | 13.51 | 13.25 | 12.45 | 12.48 |

TABLE 7-continued

| Example | 31a | 31b | 31c | 31d |
|---|---|---|---|---|
| Δ2 (%) | −0.35 | −0.35 | −0.35 | −0.35 |
| R3 (μm) | 17 | 17 | 17 | 17 |
| R1/R2 | 0.815 | 0.842 | 0.875 | 0.900 |
| LP02 Cutoff (μm) | 1.614 | 1.653 | 1.689 | 1.628 |
| LP11 Cutoff (μm) | 2.436 | 2.499 | 2.544 | 2.453 |
| LP01 Dispersion (ps/nm/km) | 21.01 | 21.11 | 21.22 | 21.17 |
| LP01 Effective Area (μm²) | 124.9 | 126.3 | 131.8 | 125.8 |
| LP01 MFD (μm) | 12.62 | 12.67 | 12.94 | 12.64 |
| LP11 Dispersion (ps/nm/km) | 20.81 | 21.05 | 21.73 | 21.44 |
| LP11 Effective Area (μm²) | 126.8 | 126.2 | 130.4 | 125.1 |
| LP01-LP02 delay at 1530 (ns/km) | −0.137 | 0.050 | −0.029 | 0.121 |
| LP01-LP02 delay at 1550 (nm/km) | −0.144 | 0.048 | −0.026 | 0.129 |
| LP01-LP02 delay at 1565 (nm/km) | −0.137 | 0.050 | −0.029 | 0.121 |
| LP01-LP02 delay slope at (ps/nm/km) | −0.0004 | −0.0001 | 0.0002 | 0.0004 |

Table 8 illustrates the attributes of an additional six index profiles for which variations of the radius and alpha parameter of the core change the sign of the differential mode group delay and differential mode group delay slopes. In embodiments 33-38, the trench is spaced from the core by an offset R2−R1. Each of embodiments 33-38 yields very low differential mode delays when made according to the prescribed dimensions. The LP01 effective area Aeff of fibers 28-32 is greater than 120 μm², more preferably between 120 and 200 μm². In an example, the theoretical cutoff wavelength of the LP02 mode is less than 2400 nm, in another example is less than 2000 nm and in another example is less than 1800 nm. In these examples, the cabled cutoff wavelength of the LP02 mode is approximately 300 nm lower than the theoretical cutoff wavelength of the LP02 mode. In an example, the theoretical cutoff wavelength of the LP11 mode is greater than 2000 nm, in another example is greater than 2200 nm and in another example is greater than 2400 nm. In an example, the attenuation of the LP01 mode is less than 0.21 dB/km, in another example is less than 0.20 dB/km and in another example is less than 0.19 dB/km. In an example, the attenuation of the LP11 mode is less than 0.25 dB/km, in another example is less than 0.23 dB/km and in another example is less than 0.21 dB/km. These optical properties are all modeled at a wavelength of 1550 nm, unless otherwise indicated.

TABLE 8

| | Example | | | | | |
|---|---|---|---|---|---|---|
| | 33 | 34 | 35 | 36 | 37 | 38 |
| Δ1 (%) | 0.477 | 0.436 | 0.455 | 0.466 | 0.463 | 0.454 |
| R1 (μm) | 10.94 | 11.04 | 11.39 | 10.79 | 11.10 | 11.02 |
| Alpha | 2.021 | 2.036 | 2.020 | 2.028 | 2.045 | 2.030 |
| R2 (μm) | 12.34 | 12.73 | 12.92 | 12.46 | 12.77 | 12.78 |
| Δ2 (%) | −0.30 | −0.30 | −0.28 | −0.33 | −0.32 | −0.32 |
| R3 (μm) | 17 | 17 | 17 | 17 | 17 | 17 |
| R1/R2 | 0.887 | 0.867 | 0.882 | 0.866 | 0.869 | 0.862 |
| LP02 Cutoff (μm) | 1.618 | 1.568 | 1.648 | 1.582 | 1.625 | 1.597 |
| LP11 Cutoff (μm) | 2.441 | 2.364 | 2.494 | 2.383 | 2.454 | 2.408 |
| LP01 Dispersion (ps/nm/km) | 21.08 | 21.14 | 21.10 | 21.08 | 21.10 | 21.10 |
| LP01 Effective Area (μm²) | 120.8 | 128.0 | 128.9 | 120.8 | 124.6 | 125.1 |
| LP01 MFD (μm) | 12.40 | 12.77 | 12.81 | 12.40 | 12.59 | 12.62 |
| LP11 Dispersion (ps/nm/km) | 21.17 | 21.15 | 21.14 | 21.14 | 21.15 | 21.12 |

TABLE 8-continued

|  | Example | | | | | |
| --- | --- | --- | --- | --- | --- | --- |
|  | 33 | 34 | 35 | 36 | 37 | 38 |
| LP11 Effective Area ($\mu m^2$) | 121.2 | 128.6 | 129.5 | 121.5 | 124.8 | 125.8 |
| LP01-LP02 delay at 1530 (ns/km) | 0.0135 | −0.004 | −0.0087 | −0.0126 | 0.0186 | −0.0197 |
| LP01-LP02 delay at 1550 (nm/km) | 0.0155 | −0.0038 | −0.0083 | −0.012 | 0.0193 | −0.0198 |
| LP01-LP02 delay at 1565 (nm/km) | 0.017 | −0.0037 | −0.0081 | −0.0115 | 0.0197 | −0.02 |
| LP01-LP02 delay slope at (ps/nm/km) | 0.01 | 0.0086 | 0.017 | 0.031 | 0.031 | −0.009 |

MDM Optical Transmission System

The few mode optical fibers 10 according to the disclosure have a low loss and a small differential group delay, and are suitable for use in optical transmission systems, particularly those that utilize MDM and that are configured for long-haul transmission.

Figure 5:
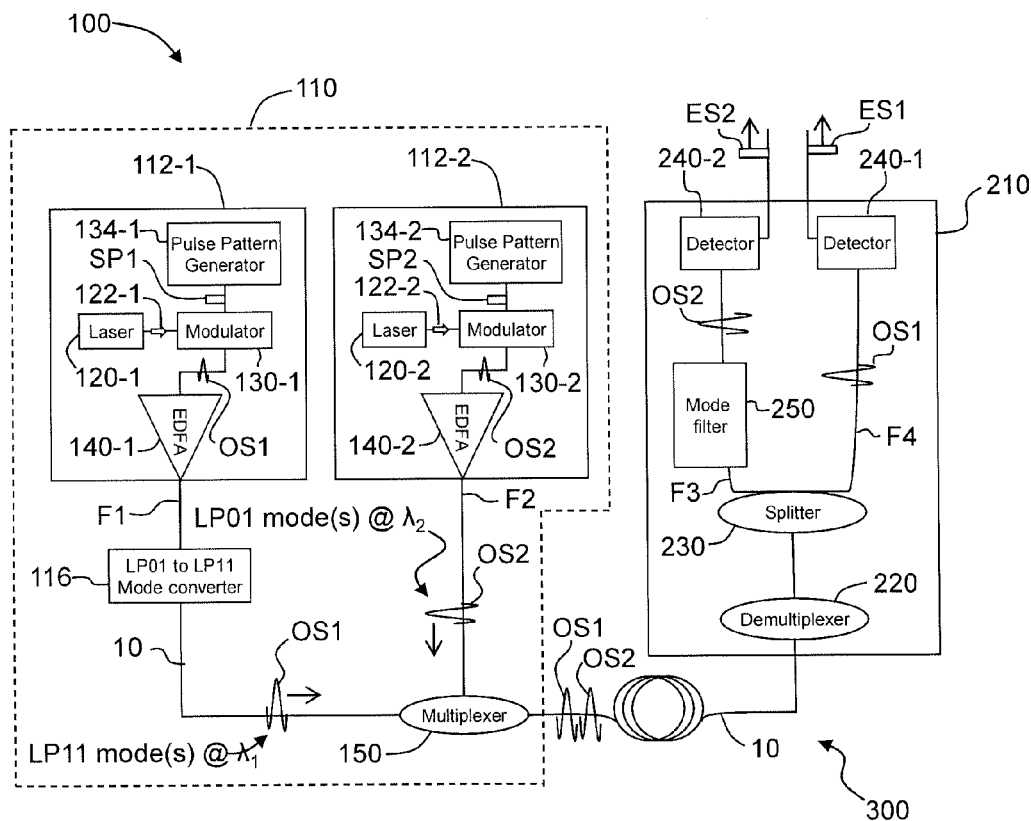
FIG. 5 is a schematic diagram of an example MDM optical transmission system that uses the few mode optical fiber disclosed herein.

FIG. 5 is a schematic diagram of an example MDM optical transmission system ("MDM system") 100. MDM system 100 includes a transmitter 110 and a receiver 210 optically connected by an optical fiber link 300 that includes at least one span of fiber 10.

Transmitter 110 includes two or more light sources 112 that emit light at the same or different wavelengths. Two light sources 112-1 and 112-2 are shown by way of illustration. Each light source 112 includes at least one laser 120 that emits light 122 having a wavelength between 1500 nm and 1600 nm. In an example, transmitter 110 includes at least 16 lasers transmitting at one or more wavelengths between 1500 and 1600 nm. In another example, transmitter 110 comprises at least 32 lasers transmitting at one or more wavelengths between 1500 and 1600 nm. In another example, transmitter 110 comprises at least 64 lasers transmitting at one or more wavelengths between 1500 and 1600 nm.

Transmitter 110 also includes a LP01-to-LP11 mode converter 116 optically connected to light source 112-1 by a fiber section F1 (e.g., a single-mode fiber section). LP01-to-LP11 mode converter 116 is configured to convert guided light traveling in the LP01 to travel in the LP11 mode. Generally, at least one of light sources 112 in transmitter 110 is optically coupled to an LP01-LP11 mode converter 116, which in an example converts at least 50% of the intensity in the LP01 mode into the LP11 mode.

Laser 120 in each light source unit 112 is optically connected to a corresponding modulator 130, which is driven by a corresponding pulse pattern generator 134 via a corresponding pulse signal SP. In an example, each modulator 130 operates at a speed of 40 Gb/s or higher. In another example, each modulator 130 operates at a speed of 100 Gb/s or higher.

In an example, each modulator 130 may be optically connected to a corresponding optical amplifier 140 such as an erbium-doped fiber amplifier (EDFA). Optical amplifier 140-1 is optically connected to LP01-to-LP11 mode converter 116, which in turn is optically connected to a multiplexer 15 via section of fiber 10. Optical amplifier 140-2 is also optically connected to wavelength multiplexer 150 via fiber section F2.

Wavelength multiplexer 150 is optically connected to transmitter 210 via fiber 10 of optical fiber link 300. Transmitter 210 includes a wavelength demultiplexer 220 optically connected to the transmitter end of fiber 10. Wavelength demultiplexer 220 is in turn optically connected to a splitter 230 that is connected to detectors 240-1 and 240-2 via respective optical fiber sections F3 and F4. A mode filter 250 is disposed in fiber section F3 to filter out either the LP01 or the LP11 mode.

In the operation of MDM system 10, each light source 120 emits light 122, which is then modulated by the corresponding modulator 130 according to the corresponding pulse signal SP from the corresponding pulse pattern generator 134. The output of modulators 130-1 and 130-2 are respective guide-wave optical signals OS1 and OS2 having respective wavelengths $\lambda_1$ and $\lambda_2$ and that propagate in the LP01 mode in respective fiber sections F1 and F2. Optical signal OS1 passes through LP01-to-LP11 mode converter 116, which converts light traveling in the LP01 mode to the LP11 mode so that optical signal OS1 propagates in the LP11 mode.

The LP11 and LP01 modes respectively associated with optical signals OS1 and OS2 are multiplexed by wavelength multiplexer 150 and then travel in fiber 10 of fiber link 300 in their respective modes. The example MDM system 10 of FIG. 5 illustrates an example where the LP01 and LP11 modes are multiplexed by after mode converter 116. However, in other examples there can be an additional wavelength multiplexer that combines optical signals at different wavelengths before sending them through the LP01-LP11 mode converter.

Figure 6:
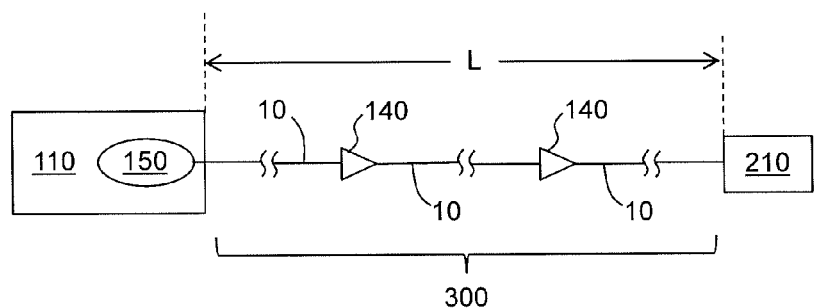
FIG. 6 is a schematic diagram of an example fiber link that optically connects the transmitter and receiver in the MDM optical transmission system of FIG. 5, wherein the fiber link has multiple spans of few mode fiber connected by optical amplifiers.

FIG. 6 is a schematic diagram of an example fiber link 300 that includes multiple spans of fiber 10 that are optically coupled to each other via one or more optical amplifiers 140. Fiber link 300 has a length of L km. In an example, L is greater than 100 km, in another example, L is greater that 500 km, in another example L is greater than 1000 km and in another example, L is greater than 2000 km. In an example, there are at least two spans of fiber 10, in another example, there are at least five spans of fiber 10, in another example, there are at least ten spans of fiber and in another example, there are at least ten spans of fiber 10. In examples where fiber link 300 includes a single span of fiber 10, the length L in one example is greater than 20 km, in another example, is greater than 40 km, and in another example is greater than 60 km.

Optical signals OS1 and OS2 enter receiver 210 and are demultiplexed by wavelength demultiplexer 220. The demultiplexed signals OS1 and OS2 are then sent through splitter 230, which diverts approximately half of the signal intensity to first detector 240-1. The remaining intensity in the signal is sent through mode filter 250 in fiber section F3, and the mode filter in this example filters out the LP01 mode. In another example, mode filter 250 filters out the LP11 mode. Detectors 240-1 and 240-2 thus detect optical signals OS1 and OS2 and convert these signals into corresponding electrical signals ES1 and ES2 that can be processed downstream by processing electronics (not shown).

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A few mode optical fiber, comprising:
   a glass core having a radius $R_1$ in the range from about 8 μm to about 14 μm, a graded refractive index profile with an alpha value greater than or equal to about 2.3 and less than about 2.7 at a wavelength of 1550 nm, a maximum relative refractive index $\Delta_{1MAX}$ in the range from about 0.3% to about 0.6% relative to a glass cladding, and an effective area at 1550 nm greater than about 90 μm² and less than about 160 μm²;
   the glass cladding immediately surrounding the glass core and having a maximum relative refractive index $\Delta_{4MAX}$ such that $\Delta_{1MAX} > \Delta_{4MAX}$; and
   wherein the glass core and glass cladding support the propagation and transmission of only LP01 modes and LP11 modes at one or more wavelengths greater than 1500 nm, with a group delay magnitude between the LP01 and LP11 modes that is less than about 0.5 ns/km at a wavelength of 1550 nm.

2. The few mode optical fiber of claim 1, wherein the glass cladding comprises a low-index ring that immediately surrounds the glass core and that has a minimum relative refractive index $\Delta_{2MIN} < \Delta_{1MAX}$.

3. The few mode optical fiber of claim 1, wherein the glass cladding comprises a low-index ring surround the core and having a relative refractive index $\Delta_{2MIN} < \Delta_{1MAX}$, with an annular inner cladding disposed in between the core and the low-index ring.

4. The few mode optical fiber of claim 1, further comprising a group delay magnitude between the LP01 modes and the LP11 modes that is less than about 0.3 ns/km at a wavelength of 1550 nm.

5. The few mode optical fiber of claim 1, further comprising a pin array bending loss of the LP11 modes that is less than or equal to 20 dB at 1550 nm.

6. The few mode optical fiber of claim 1, further comprising:
   a cutoff wavelength for an LP02 mode that is less than 1800 nm; and
   a cutoff wavelength for the LP11 modes that is greater than 2400 nm.

7. The few mode optical fiber of claim 2, wherein the low-index ring has a radial thickness in the range from about 2 μm to about 15 μm.

8. The few mode optical fiber of claim 3, wherein the inner cladding has a radial thickness less than or equal to about 5 μm.

9. A mode division multiplexing (MDM) optical transmission system, comprising:
   a transmitter configured to transmit first and second guided-wave optical signals respectively having a first and a second wavelength, respectively, in an LP11 mode and an LP01 mode, respectively;
   a receiver configured to receive and wavelength demultiplex the first and second optical signals; and
   the few mode optical fiber of claim 1 configured to optically connect the transmitter and the receiver and support the transmission of the first and second guided-wave optical signals from the transmitter to the receiver.

10. A few mode optical fiber, comprising:
    a glass core comprising a radius $R_1$ from about 8 μm to about 14 μm, a graded refractive index profile with an alpha value greater than or equal to about 1.9 and less than about 2.7 at a wavelength of 1550 nm, a maximum relative refractive index $\Delta_{1MAX}$ from about 0.3% to about 0.6% relative to a glass cladding, and an effective area at 1550 nm greater than about 90 μm² and less than about 160 μm²;
    the glass cladding comprising a low-index ring that surrounds the class core and having with a minimum relative refractive index $\Delta_{2MIN} < 0$, and an outer cladding layer surrounding the low-index ring and having a maximum relative refractive index $\Delta_{4MAX}$ such that $\Delta_{1MAX} > \Delta_{4MAX} > \Delta_{2MIN}$; and
    wherein the glass core and glass cladding support the propagation and transmission of only LP01 modes and LP11 modes at one or more wavelengths greater than 1500 nm.

11. The few mode optical fiber of claim 10, further comprising an inner cladding disposed immediately adjacent and surrounding the core, the inner cladding having a relative refractive index $\Delta_3$ wherein $\Delta_{2MIN} < \Delta_3 \leq \Delta_{4MAX}$.

12. The few mode optical fiber of claim 10, further comprising a group delay magnitude between the LP01 modes and the LP11 modes that is less than about 0.5 ns/km at a wavelength of 1550 nm.

13. The few mode optical fiber of claim 10, further comprising:
    a cutoff wavelength for an LP02 mode that is less than 1600 nm; and
    a cutoff wavelength for the LP11 modes that is greater than 2000 nm.

14. A mode division multiplexing (MDM) optical transmission system, comprising:
    a transmitter configured to transmit first and second guided-wave optical signals having a first and a second wavelength, respectively, in an LP11 mode and an LP01 mode, respectively;
    a receiver configured to receive and wavelength demultiplex the first and second optical signals; and
    at least one few mode optical fiber of claim 10 configured to optically connect the transmitter and the receiver and support the transmission of the first and second guided-wave optical signals from the transmitter to the receiver.

15. A few mode optical fiber, comprising:
    a glass core comprising a radius $R_1$ in the range from about 8 μm to about 14 μm, a graded refractive index profile with an alpha value greater than or equal to about 1.9 and less than about 2.7 at a wavelength of 1550 nm, a maximum relative refractive index $\Delta_{1MAX}$ from about 0.3% to about 0.6% relative to a glass cladding, and an effective area at 1550 nm greater than about 90 μm² and less than about 160 μm²;
    the glass cladding comprising a low-index ring that surrounds the core but is spaced apart therefrom by an inner cladding and having a minimum relative refractive index $\Delta_{2MIN} < 0$, and an outer cladding layer with a maximum relative refractive index $\Delta_{4MAX}$ such that $\Delta_{1MAX} > \Delta_4\% > \Delta_{2MIN}\%$; and
    wherein the glass core and glass cladding support the propagation and transmission of only LP01 modes and LP11 modes at one or more wavelengths greater than 1500 nm.

16. The few mode optical fiber of claim 15, further comprising a group delay magnitude between the LP01 and LP11 modes that is less than about 0.5 ns/km at a wavelength of 1550 nm.

17. The few mode optical fiber of claim 15, further comprising:
   a cutoff wavelength for an LP02 mode that is less than 1600 nm; and
   a cutoff wavelength for the LP11 modes that is greater than 2000 nm.

18. The few mode optical fiber of claim 15, wherein the inner cladding has a radial thickness less than or equal to about 5 μm.

19. The few mode optical fiber of claim 15, wherein the inner cladding has a relative refractive index $\Delta_3 \leq \Delta_{4MAX}$.

20. A mode division multiplexing (MDM) optical transmission system, comprising:
   a transmitter configured to transmit first and second guided-wave optical signals respectively having a first and a second wavelength, respectively, in an LP11 mode and an LP01 mode, respectively;
   a receiver configured to receive and wavelength demultiplex the first and second optical signals; and
   the few mode optical fiber of claim 15 configured to optically connect the transmitter and the receiver and support the transmission of the first and second guided-wave optical signals from the transmitter to the receiver.

* * * * *